United States Patent
Chan et al.

(10) Patent No.: US 11,477,048 B2
(45) Date of Patent: Oct. 18, 2022

(54) COMMUNICATION METHOD FOR ONE-WAY TRANSMISSION BASED ON VLAN ID AND SWITCH DEVICE USING THE SAME

(71) Applicant: BlackBear (Taiwan) Industrial Networking Security Ltd., Hsinchu (TW)

(72) Inventors: Yuan Chen Chan, Hsinchu (TW); Po-Chih Hsu, Changhua County (TW)

(73) Assignee: BlackBear (Taiwan) Industrial Networking Security Ltd., Hsinchu (TW)

(*) Notice: Subject to any disclaimer, the term of this patent is extended or adjusted under 35 U.S.C. 154(b) by 0 days.

(21) Appl. No.: 17/306,871

(22) Filed: May 3, 2021

(65) Prior Publication Data

US 2022/0231881 A1   Jul. 21, 2022

Related U.S. Application Data

(60) Provisional application No. 63/137,761, filed on Jan. 15, 2021.

(51) Int. Cl.
    *H04L 12/28* (2006.01)
    *H04L 12/46* (2006.01)
    (Continued)

(52) U.S. Cl.
    CPC ...... *H04L 12/4645* (2013.01); *H04L 12/4679* (2013.01); *H04L 61/103* (2013.01); *H04L 61/2517* (2013.01); *H04L 61/5069* (2022.05)

(58) Field of Classification Search
    None
    See application file for complete search history.

(56) References Cited

U.S. PATENT DOCUMENTS

| 5,703,562 A | 12/1997 | Nilsen |
| 7,649,452 B2 | 1/2010 | Zilberstein et al. |

(Continued)

FOREIGN PATENT DOCUMENTS

| TW | 201519607 | | 5/2015 | | |
| WO | WO-2013029440 A1 | * | 3/2013 | ......... | H04L 12/4633 |
| WO | WO-2014078271 A1 | * | 5/2014 | ......... | G06F 13/4022 |

OTHER PUBLICATIONS

"Search Report of Europe Counterpart Application", dated Sep. 28, 2021, p. 1-p. 8.

(Continued)

*Primary Examiner* — Phyllis A Book
(74) *Attorney, Agent, or Firm* — JCIPRNET

(57) ABSTRACT

A communication method and a switch device for one-way transmission based on VLAN ID are provided. The communication method includes: receiving, by a first port of a switch, a first data packet from a first external device; packing the first data packet with a first VLAN ID corresponding to a first path to generate a second data packet; receiving, by a first PLD, the second data packet from a third port of the switch; filtering, by the first PLD, the second data packet according to a first filtering rule; in response to the second data packet being matched with the first filtering rule, overwriting the first VLAN ID by a second VLAN ID corresponding to a second path to generate a third data packet; and transmitting, by the first PLD, the third data packet to a second port of the switch via the second path.

10 Claims, 5 Drawing Sheets

(51) Int. Cl.
  *H04L 61/5069* (2022.01)
  *H04L 61/103* (2022.01)
  *H04L 61/2517* (2022.01)

(56) References Cited

U.S. PATENT DOCUMENTS

| | | | |
|---|---|---|---|
| 7,706,433 B2* | 4/2010 | Chan | H04L 43/00 |
| | | | 375/259 |
| 8,081,631 B1* | 12/2011 | Chase | H04L 12/4645 |
| | | | 370/399 |
| 8,250,235 B2 | 8/2012 | Harvey et al. | |
| 8,250,358 B2 | 8/2012 | Cheng | |
| 8,352,450 B1 | 1/2013 | Mraz et al. | |
| 8,353,022 B1 | 1/2013 | Menoher et al. | |
| 8,732,453 B2 | 5/2014 | Mraz et al. | |
| 8,776,254 B1 | 7/2014 | Mraz et al. | |
| 8,891,546 B1 | 11/2014 | Frenkel et al. | |
| 8,893,253 B2 | 11/2014 | Cianfrocca | |
| 9,088,539 B2 | 7/2015 | Mraz | |
| 9,088,558 B2 | 7/2015 | Curry et al. | |
| 9,306,953 B2 | 4/2016 | Mraz et al. | |
| 9,521,120 B2 | 12/2016 | Ferry | |
| 9,584,521 B2 | 2/2017 | Frenkel | |
| 9,590,820 B1* | 3/2017 | Shukla | H04L 45/64 |
| 9,729,507 B2 | 8/2017 | Fischer et al. | |
| 9,736,121 B2 | 8/2017 | Mraz et al. | |
| 9,749,011 B2 | 8/2017 | Kim et al. | |
| 9,762,536 B2 | 9/2017 | Frenkel et al. | |
| 9,847,972 B2 | 12/2017 | Frenkel et al. | |
| 9,853,918 B2 | 12/2017 | Mraz et al. | |
| 10,218,715 B2 | 2/2019 | Thomson et al. | |
| 2002/0009083 A1* | 1/2002 | Ambe | H04L 47/266 |
| | | | 370/392 |
| 2006/0062187 A1 | 3/2006 | Rune | |
| 2008/0031260 A1* | 2/2008 | Polland | H04L 49/45 |
| | | | 370/389 |
| 2009/0122801 A1 | 5/2009 | Chang | |
| 2012/0106553 A1* | 5/2012 | Melman | H04L 49/109 |
| | | | 370/392 |
| 2012/0176893 A1 | 7/2012 | Ghanwani et al. | |
| 2013/0010954 A1 | 1/2013 | Falk et al. | |
| 2014/0119354 A1* | 5/2014 | Verma | H04L 12/4633 |
| | | | 370/338 |
| 2014/0137215 A1* | 5/2014 | Hummel | H04L 12/4641 |
| | | | 726/5 |
| 2015/0030027 A1* | 1/2015 | Manzella | H04L 12/4625 |
| | | | 370/392 |
| 2015/0085868 A1* | 3/2015 | Snyder, II | G06F 9/45558 |
| | | | 370/401 |
| 2015/0236911 A1* | 8/2015 | Unnimadhavan | H04L 12/462 |
| | | | 370/254 |
| 2015/0236946 A1* | 8/2015 | Unnimadhavan | H04L 1/24 |
| | | | 370/244 |
| 2016/0072642 A1 | 3/2016 | Shih | |
| 2017/0195213 A1* | 7/2017 | Evans | H04L 45/24 |
| 2017/0353368 A1 | 12/2017 | Blocher et al. | |
| 2018/0227195 A1* | 8/2018 | Dumitriu | H04L 41/145 |
| 2020/0007383 A1* | 1/2020 | Efraim | H04L 49/30 |
| 2020/0053048 A1 | 2/2020 | Frenkel | |
| 2020/0120071 A1 | 4/2020 | Wimmer et al. | |
| 2020/0259585 A1 | 8/2020 | Aust et al. | |
| 2020/0342153 A1 | 10/2020 | Staubly et al. | |
| 2021/0184895 A1* | 6/2021 | Nunes | H04L 45/64 |
| 2022/0231881 A1* | 7/2022 | Chan | H04L 61/103 |

OTHER PUBLICATIONS

"Office Action of Taiwan Counterpart Application", dated Apr. 25, 2022, p. 1-p. 4.

Yuan Chen Chan, et al., "Switch Device for One-Way Transmission", Unpublished U.S. Appl. No. 17/149,633, filed Jan. 14, 2021.

* cited by examiner

COMMUNICATION METHOD FOR ONE-WAY TRANSMISSION BASED ON VLAN ID AND SWITCH DEVICE USING THE SAME

CROSS-REFERENCE TO RELATED APPLICATION

This application claims the priority benefit of U.S. provisional application Ser. No. 63/137,761, filed on Jan. 15, 2021. The entirety of the above-mentioned patent application is hereby incorporated by reference herein and made a part of this specification.

BACKGROUND

Technical Field

The disclosure is directed to a communication method and a switch device for one-way transmission based on virtual local area network identifier (VLAN ID).

Description of Related Art

In order to prevent a secure site (or OT: operation technology site) from being attacked by computer virus or hackers from Internet, a one-way transmission technique is normally used for performing a data transmission between the secure site and an unsecure site (or IT: information technology site). A one-way link may limit the direction of signals such that the signals can only be transmitted from the secure site to the unsecure site, and no signals can be transmitted from the unsecure site to the secure site.

FIG. 1 illustrates a schematic diagram of a one-way link device 90. The one-way link device 90 includes a switch 91 and a one-way link circuit 92, wherein the switch 91 is coupled to the one-way link circuit 92. The one-way link circuit 92 may be, for example, a programmable logic device. A device in the secure site 81 (e.g., device A or device B) for performing a regular diagnosis or firmware update procedure may be infected by a virus. Therefore, how to prevent devices in the secure site 81 from infecting each other is an important issue to the art. In order to prevent the devices in the secure site 81 from infecting each other, the one-way link device 90 may be disposed between the secure site 81 and the unsecure site 82. The switch 91 of the one-way link device 90 includes a port A, a port B, and a port C, wherein the port A is coupled to a device A in the secure site 81, the port B is coupled to a device B in the secure site 81, and the port C is coupled to the input end of the one-way link circuit 92. The output end of the one-way link circuit 92 is coupled to the device C. The data from the port C can be transmitted to the device C through the one-way link circuit 92, but the data from the device C cannot be transmitted to the port C through the one-way link circuit 92. Accordingly, the data from the device A can be transmitted to the device C through the one-way link device 90, but the data from the device C cannot be transmitted to the device A through the one-way link device 90. The data from the device B can be transmitted to the device C through the one-way link device 90, but the data from the device C cannot be transmitted to the device B through the one-way link device 90. The one-way link device 90 may be configured to isolate the device A from the device B. Since the device A cannot communicate with the device B, the device A would not infect the device B if the device A has been infected, thus a virus or a malware cannot be distributed over the secure site 81. However, in some cases, the device A may need to exchange data with the device B, and the one-way link device 90 cannot resolve such issue. Since the data cannot be transmitted from the device C to the device A (or device B), the device A and the device B cannot exchange data through the device C.

The other way to prevent devices in the secure site 81 from infecting each other is to configure a high-end computer (i.e., firewall) with a lot of Ethernet ports respectively connected to the device A, the device B, and the device C. The device A may transmit a data packet to the device B through the high-end computer. The high-end computer would check if the data packet is safe or not. If the data packet is safe, the high-end computer would forward the data packet to the device B. This method would delay the communication between the device A and the device B since the high-end computer needs to execute a TCP/IP protocol software for the data packet. This high-end computer still needs to be protected.

SUMMARY

Accordingly, the present disclosure is directed to a method and a switch device for one-way transmission based on VLAN ID. The present disclosure may prevent a device in a secure site from being attacked by a device the same secure site or by a device in an unsecure site.

The disclosure is directed to a switch device for one-way transmission based on virtual local area network identifier. The switch device includes a managed switch and a first programmable logic device. The switch includes a first port, a second port, a third port, and a controller. The third port is configured to be coupled to the first port via a first path and coupled to the second port via a second path. The controller is coupled to the first port, the second port, and the third port. The first programmable logic device is coupled to the third port, wherein the first port receives a first data packet from a first external device; the controller packs the first data packet with a first virtual local area network identifier corresponding to the first path to generate a second data packet; the first programmable logic device receives the second data packet from the third port and filters the second data packet according to a first filtering rule; in response to the second data packet being matched with the first filtering rule, the first programmable logic device overwrites the first virtual local area network identifier by a second virtual local area network identifier corresponding to the second path to generate a third data packet; and the first programmable logic device transmits the third data packet to the second port via the second path so as to output the third data packet via the second port.

In an exemplary embodiment of the disclosure, the second data packet includes a destination address, wherein the first programmable logic device stores a mapping table, wherein the first programmable logic device overwrites the first virtual local area network identifier by the second virtual local area network identifier in response to a mapping relationship between the destination address and the second virtual local area network identifier being recorded in the mapping table.

In an exemplary embodiment of the disclosure, the first programmable logic device drops the second data packet in response to the mapping relationship between the destination address and the second virtual local area network identifier not being recorded in the mapping table.

In an exemplary embodiment of the disclosure, the second data packet further includes a frame check sequence, wherein the first programmable logic device updates the frame check sequence to generate the third data packet in response to overwriting the first virtual local area network identifier by the second virtual local area network identifier.

In an exemplary embodiment of the disclosure, the first port receives an address query packet from the first external device and transmits the address query packet to the third port, wherein the address query packet includes an Internet protocol (IP) address; the first programmable logic device receives the address query packet from the third port and generates a response packet corresponding to the address query packet; and the first programmable logic device transmits the response packet to the first port via the third port.

In an exemplary embodiment of the disclosure, the first programmable logic device stores a mapping table, wherein the first programmable logic device generates the response packet by: setting a source address of the response packet to a media access control (MAC) address associated with the IP address in response to a mapping relationship between the IP address and the MAC address being recorded in the mapping table.

In an exemplary embodiment of the disclosure, the first programmable logic device generates the response packet by: broadcasting the IP address to a second external device via the second port; receiving a media access control (MAC) address from the second external device via the second port in response to broadcasting the IP address; and setting a source address of the response packet to the MAC address.

In an exemplary embodiment of the disclosure, the first programmable logic device stores a mapping table, wherein the first programmable logic device adds a mapping relationship between the IP address and the MAC address to the mapping table in response to receiving the MAC address from the second external device.

In an exemplary embodiment of the disclosure, the first programmable logic device generates the response packet further by: setting a target hardware address of the response packet to the MAC address.

In an exemplary embodiment of the disclosure, the first filtering rule corresponds to at least one of a port number or a transmission protocol, wherein the transmission protocol includes one of a Modbus protocol, an IEC 60870-5-101 protocol, a distributed network protocol, and a programmable logic controller protocol.

The disclosure is directed to a communication method for one-way transmission based on virtual local area network identifier. The communication method includes: coupling a first port of a switch and a third port of the switch via a first path, coupling a second port of the switch and the third port via a second path, and coupling a first programmable logic device and the third port; receiving, by the first port, a first data packet from a first external device; packing the first data packet with a first virtual local area network identifier corresponding to the first path to generate a second data packet; receiving, by the first programmable logic device, the second data packet from the third port; filtering, by the first programmable logic device, the second data packet according to a first filtering rule; in response to the second data packet being matched with the first filtering rule, overwriting the first virtual local area network identifier by a second virtual local area network identifier corresponding to the second path to generate a third data packet; and transmitting, by the first programmable logic device, the third data packet to the second port via the second path so as to output the third data packet via the second port.

In view of the foregoing, the present disclosure may filter data packets for the transmissions between the plurality of devices in the secure site, thus the security of the transmissions can be guaranteed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
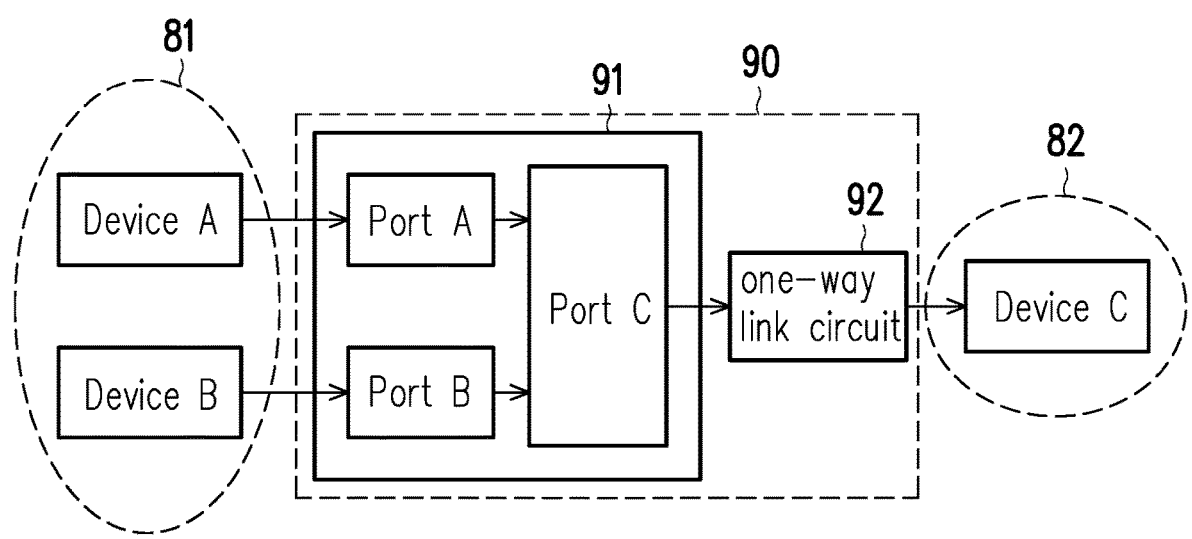
FIG. 1 illustrates a schematic diagram of a one-way link device.

In order to make the disclosure more comprehensible, several embodiments are described below as examples of implementation of the disclosure. Moreover, elements/components/steps with the same reference numerals are used to represent identical or similar parts in the figures and embodiments where appropriate.

Figure 2:
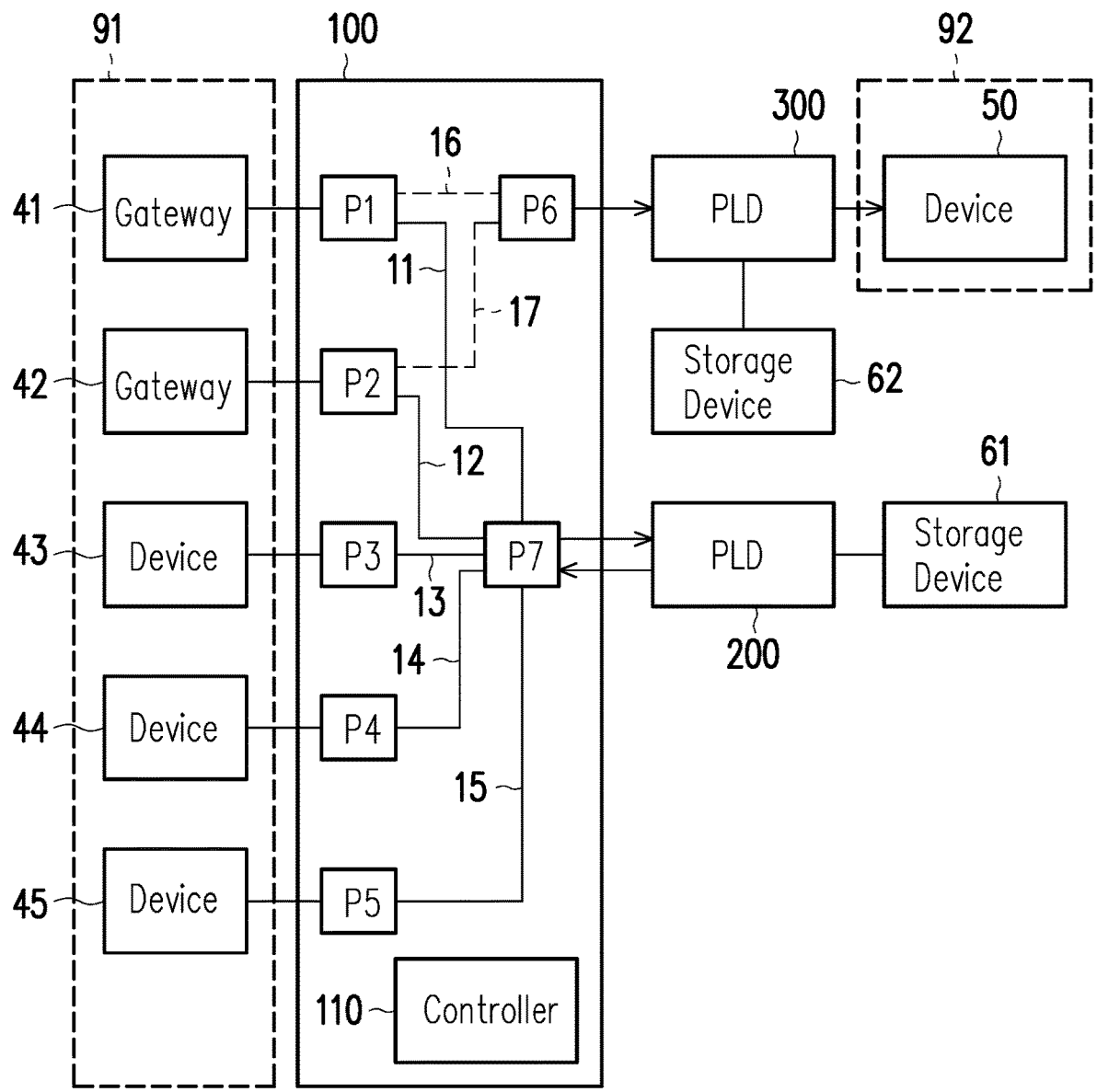
FIG. 2 illustrates a schematic diagram of a switch device according to an embodiment of the disclosure.

FIG. 2 illustrates a schematic diagram of a switch device 10 according to an embodiment of the disclosure. The switch device 10 may include a switch (or a managed switch) 100, a programmable logic device (PLD) 200, and a PLD 300.

The switch 100 may include a controller 110, port P1 (also referred to as "first port"), port P2 (also referred to as "second port"), port P3, port P4, port P5, port P6 (also referred to as "fourth port"), and port P7 (also referred to as "third port"). The controller 110 may determine routing paths between the ports of the switch 100 by configuring a port VLAN ID (PVID) for each of the ports. Furthermore, the controller 110 may assign a port to a VLAN ID group. The ports belong to the same VLAN ID group may communicate with each other. Specifically, if a data packet passes through a port which has a specific PVID, the data packet may be tagged with a VLAN ID corresponding to the specific PVID by the controller 110. The switch 100 or the controller 110 may route the path of the data packet according to the VLAN ID of the data packet. After the data packet is received by another port, the another port may identify a path which the data packet comes from based on the VLAN ID stored in a VLAN tag field of the data packet if the VLAN ID has not been removed.

For example, a default PVID (e.g., PIVD 1) may be assigned to all the ports of the switch 100 such that all the ports of the switch 100 may communicate with each other. That is, the controller 110 may configure all the ports to be coupled to each other. However, the final routing path may depend on the destination MAC address of a MAC address table stored in the switch 100. For another example, in order to assign the port P1 and the port P6 to a VLAN ID group corresponding to VLAN ID 16, the controller 110 may configure the PVID of the port P1 and the port P6 to PVID 16 corresponding to the VLAN ID 16. That is, the controller 110 may configure the port P1 to be coupled to the port P6 via path 16. Thus, the data packet passes through the port P1 may be tagged with VLAN ID 16, and the controller 110 may transmit the data packet from the port P1 to the port P6 via the path 16 corresponding to the VLAN ID 16. Normally, only a data packet transmitted inside a switch would be tagged with a PVID. The PVID tag would be removed when the data packet is outputted from the switch to an external device.

The controller 110 may assign the PVID of port P1 to VLAN ID 11, and may configure the port P6 and the port P7 to join VLAN ID 11 group. That is, the port P1 may be coupled to the port P6 via the path 16 and may be coupled to the port P7 via the path 11, wherein the path 11 and the path 16 are belonged to the VLAN ID 11 group. The port P1 may be coupled to a device disposed in a secure site 91 such as the gateway 41 (or proxy server 41). The controller 110 may assign the PVID of port P2 to VLAN ID 12, and may configure the port P6 and the port P7 to join VLAN ID 12 group. That is, the port P2 may be coupled to the port P6 via the path 17 and may be coupled to the port P7 via the path 12, wherein the path 12 and the path 17 are belonged to the VLAN ID 12 group. The port P2 may be coupled to a device disposed in the secure site 91 such as the gateway 42 (or proxy server 42). The controller 110 may assign PVID of the port P3 to VLAN ID 13, and may configure the port P7 to join VLAN ID 13 group. That is, the port P3 may be coupled to the port P7 via the path 13 corresponding to the VLAN ID 13 group. The port P3 may be coupled to a device disposed in the secure site 91 such as the device 43, wherein the device 43 may include a plurality of electronic devices or a plurality of sensors. The controller 110 may assign PVID of the port P4 to VLAN ID 14, and may configure the port P7 to join VLAN ID 14 group. That is, the port P4 may be coupled to the port P7 via the path 14 corresponding to the VLAN ID 14 group. The port P4 may be coupled to a device disposed in the secure site 91 such as the device 44, wherein the device 44 may include a plurality of electronic devices or a plurality of sensors. The controller 110 may assign PVID of the port P5 to VLAN ID 15, and may configure the port P7 to join VLAN ID 15 group. That is, the port P5 may be coupled to the port P7 via the path 15 corresponding to the VLAN ID 15 group. The port P5 may be coupled to a device disposed in the secure site 91 such as the device 45, wherein the device 45 may include a plurality of electronic devices or a plurality of sensors.

The port P6 may be coupled to the PLD 300, and the port P6 may be accessed by a device (e.g., gateway) via port P1 or port P2. The port P7 may be coupled to the PLD 200. In one embodiment, if a VLAN ID is stored in a VLAN tag field of a data packet, the controller may not tag the data packet while the data packet being inputted to the switch 100. For example, assuming that a data packet transmitted from the PLD 200 to the port P7 stores a VLAN ID. Accordingly, the data packet may not be tagged with another VLAN ID while passing through the port P7. That is, the VLAN ID of the data packet transmitted from the port P7 to other ports of the switch 100 may not be changed by the controller 110. Therefore, the PVID of port P7 may not affect the data routing of the switch 100. In one embodiment, the port P6 is been assigned at least to the VLAN ID 11 group and the VLAN ID 12 group. The port P7 is been assigned to at least the VLAN ID 11 group, VLAN ID 12 group, VLAN ID 13 group, VLAN ID 14 group, and VLAN ID 15 group. Since no data packet would be inputted to the switch 100 via the port P6, the PVID of the port P6 may not affect the data routing of the switch 100.

The controller 110 may be, for example, a central processing unit (CPU), a programmable microprocessor, a digital signal processor (DSP), a programmable controller, an application specific integrated circuit (ASIC), a graphics processing unit (GPU), a PLD or other similar elements, or a combination thereof. The controller 110 may be coupled to port P1, port P2, port P3, port P4, port P5, port P6, and port P7. The controller 110 may include a storage medium, wherein the storage medium may include, for example, any type of fixed or removable random access memory (RAM), a read-only memory (ROM), a flash memory, a hard disk drive (HDD), a solid state drive (SSD) or similar elements, or a combination thereof, configured to record a plurality of modules or various applications executable by the controller 110.

The PLD 200 or (the PLD 300) may include, for example, a fiber, diode circuit, a RJ45 connector, a programmable array logic (PAL), a generic array logic (GAL), a complex PLD (CPLD), a field programmable gate array (FPGA) or similar elements, or a combination thereof.

A device in the secure site 91 may transmit a data packet to a device in the unsecure site 92 via the PLD 300. For example, if the gateway 42 wants to transmit a data packet to the device 50, the gateway 42 may transmit the data packet to the PLD 300 via the port P2, the path 17, and the port P6, wherein the port P6 may output the data packet to the PLD 300. The PLD 300 may forward the data packet to the device 50 in response to receiving the data packet from the port P6. Specifically, the PLD 300 may store a second filtering rule, wherein the second filtering rule may limit the direction of the signal pass through the PLD 300. According to the second filtering rule, the PLD 300 may transmit the data packets from the switch 100 (or port P6) to the device 50 which is disposed in the unsecure site 92, but the PLD 300 may not transmit the data packets from the device 50 to the switch 100, wherein the device 50 may be an electronic device or a server. Accordingly, no data packet can be sent from the unsecure site 92 to the secure site 91, thus a device in the secure site 91 will not be attacked by a device in the unsecure site 92.

After receiving a data packet from the port P6, the PLD 300 may filter the data packet according to the second filtering rule. If the data packet is matched with the second filtering rule, the PLD 300 may determine to output the data packet to the device 50. If the data packet is not matched with the second filtering rule, the PLD 300 may determine to drop the data packet, or the PLD 300 may determine to transmit the data packet to a storage device 62 for further analysis, wherein the storage device 62 may be coupled to the PLD 300. In one embodiment, the second filtering rule may be associated with a UDP port number or a transmission protocol. For example, the second filtering rule may include a UDP port number of the port P6. If the PLD 300 determine that the data packet received by the PLD 300 does not include a port number matched with the UDP port number of the port P6, the PLD 300 may drop the data packet or transmit the data packet to the storage device 62. In one embodiment, the transmission protocol may be a unidirectional protocol such as user datagram protocol (UDP), real time transport protocol (RTP), simple network management protocol (SNMP), or routing information protocol (RIP).

A device in the secure site 91 may transmit a data packet to another device in the secure site 91 via the PLD 200. For example, if the gateway 41 wants to query data from device 44, the gateway 41 may transmit a data packet to the PLD 200 via the port P1, the path 11, and the port P7, wherein the port P7 may output the data packet to the PLD 200. The PLD 200 may forward the data packet to the device 44 in response to receiving the data packet from the port P7. Specifically, the PLD 200 may pre-store a first filtering rule, wherein the PLD 200 may filter the data packet pass through the PLD 200 according to the first filtering rule. If the data packet from the source device (i.e., gateway 41) is matched with the first filtering rule, the PLD 200 may determine to forward the data packet to the target device of the data packet (i.e., device 44). If the data packet from the source device is not matched with the first filtering rule, the PLD 200 may drop the data packet, or the PLD 200 may determine to transmit the data packet to a storage device 61 for further analysis, wherein the PLD 200 may be coupled to the storage device 61.

In one embodiment, the first filtering rule may be associated with a TCP/UDP port number or a transmission protocol. In one embodiment, the transmission protocol may be a bi-directional protocol for example but not limited such as Modbus protocol, an IEC 60870-5-104 protocol, distributed network protocol (DNP), or programmable logic controller (PLC) protocol. For example, the first filtering rule may include a TCP/UDP port number of the data packets. If the PLD 200 determine that the data packet received by the PLD 200 does not include a port number matched with the TCP/UDP port number of the data packets from port P7, the PLD 200 may drop the data packet or transmit the data packet to the storage device 61. For another example, the first filtering rule may be associated with the DNP protocol, wherein the data packet supporting the DNP protocol may have a leading code 0x27, a header 0x05, and a header 0x64. The PLD 200 may determine whether the data packet received from the port P7 support the DNP protocol by checking the leading code and the header of the data packet. If the PLD 200 determine that the data packet received from the port P7 does not support the DNP protocol, the PLD 200 may drop the data packet or transmit the data packet to the storage device 61. For the other example, the first filtering rule may be associated with the IEC 60870-5-104 protocol, wherein the data packet supporting the IEC 60870-5-104 protocol may have a leading code 0x68 and an end code 0x16. The PLD 200 may determine whether the data packet received from the port P7 support the IEC 60870-5-104 protocol by checking the leading code and the end code of the data packet. If the PLD 200 determine that the data packet received from the port P7 does not support the IEC 60870-5-104 protocol, the PLD 200 may drop the data packet or transmit the data packet to the storage device 61.

A switch based on IEEE 802.1Q may dynamically update a MAC address table and may perform the internal data transmission of the switch according to the MAC address table. The controller 110 may store a MAC address table of the switch 100, wherein the MAC address table may record a mapping relationship between a port and a MAC address corresponding to a device coupled to the port. For example, if the port P1 is coupled to the gateway 41, the data packets transmitted from the gateway 41 to the port P1 may include a source address, wherein the source address may be the MAC address of the gateway 41. The controller 110 may retrieve the MAC address of the gateway 41 from the data packets pass through the port P1. Then, the controller 110 may update the MAC address table according to the MAC address of the gateway 41, wherein the updated address table may record the mapping relationship between the port P1 and the MAC address of the gateway 41.

However, since all the data packets transmitted between different ports of the switch 100 need to be forwarded via the port P7, the way mentioned above is not suitable for the switch 100. Specifically, two data packets with the same source address may be sent into the switch 100 via two different ports respectively. The controller 110 may need to update the previous record of the MAC address table, or to treat one of the two data packets as a malformed packet, wherein the malformed packet may be discarded by the switch 100. For example, if the device 44 wants to transmit a data packet to the device 45, the data packet may be transmitted from the device 44 to the PLD 200, wherein the source address of the data packet may be the MAC address of the device 44. The controller 110 may update the MAC address table to record the mapping relationship between the MAC address of the device 44 and the port P4. In response to receiving the data packet from the device 44, the PLD 200 may filter the data packet according to the first filtering rule. If the data packet is matched with the first filtering rule, the PLD 200 may transmit the data packet to the device 45. Since the source address of the data packet is still the MAC address of the device 44, the controller 110 may update the MAC address table to record the mapping relationship between the MAC address of the device 44 and the port P7. Accordingly, the switch 100 may consider that the port P4 and the port P7 are coupled to the devices with the same MAC address. Thus, the controller 110 needs to overwrite the mapping relationship between the MAC address of the device 44 and the port 4 by the mapping relationship between the MAC address of the device 44 and the port P7 or to discard the data packet transmitted from the port P7 (or from the port P4). More than one device with the same MAC address couples to different ports of the switch 100 respectively would violate the fundamental concept of the switch technology.

Figure 3:
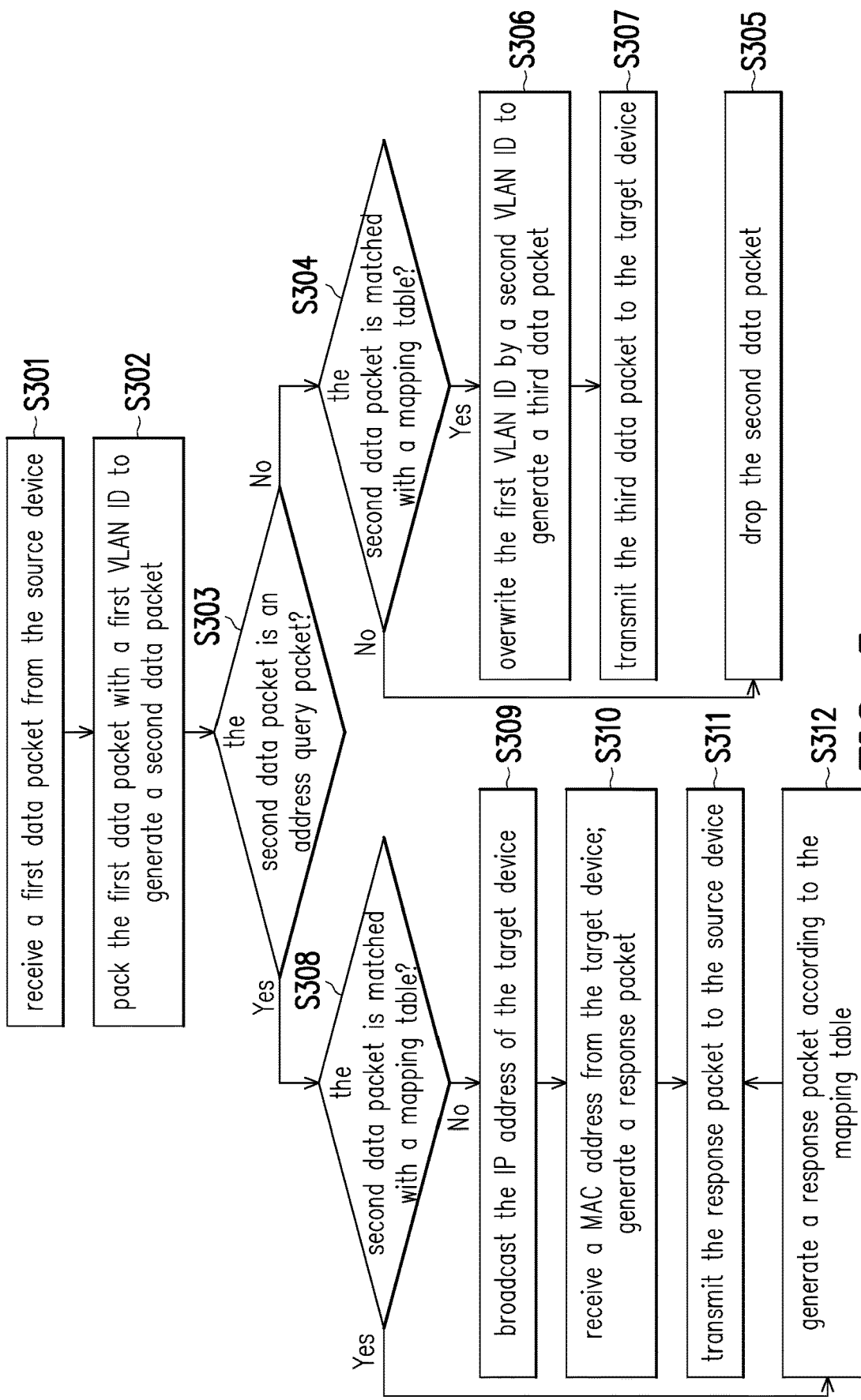
FIG. 3 illustrates a flowchart of a communication method based on VLAN ID according to an embodiment of the disclosure.

To solve the problem mentioned above, the present invention discloses a method to perform the internal data transmission of the switch based on VLAN ID. FIG. 3 illustrates a flowchart of a communication method based on VLAN ID according to an embodiment of the disclosure, wherein the communication method may be implemented by the switch device 10 as show in FIG. 2. Assuming that the gateway 41 wants to transmit a first data packet to the device 44. That is, the gateway 41 may be a source device, and the device 44 may be a target device.

In step S301, the switch 100 may receive a first data packet from the source device. For example, if the gateway 41 wants to transmit a first data packet to the device 44, the switch 100 may receive the first data packet from the gateway 41 via the port P1.

In step S302, the controller 110 of the switch 100 may pack the first data packet with a first VLAN ID (i.e., PVID of a port) corresponding to a first path to generate a second data packet, and may transmit the second data packet to the PLD 200. For example, the controller 110 may pack the first data packet with VLAN ID 11 (i.e., first VLAN ID or PVID of port P1) corresponding to the path 11 (i.e., first path) so as to generate the second data packet, and the controller 110 may transmit the second data packet to the PLD 200 via the port P1, the path 11, and the port P7. The controller 110 may obtain the VLAN ID 11 from a default table, wherein the default table may be pre-stored in the controller 110 and may include a mapping relationship between a VLAN ID and a path of the switch 100. Table 1 is an example of the default table. If a data packet entering to the switch 100 does not include a VLAN ID, the controller 110 may pack the data packet with the VLAN ID according to the default table, wherein the VLAN ID may correspond to the path which the data packet would pass through. If data packets are required to pass to unsecure site 92, only port P1 (or Gateway 41) or port P2 (or Gateway 42) may transmit the data packets to the unsecure site 92 based on the VLAN ID 11 or 12. A data packet passed to the unsecure site needs to fulfill the security criterion. For example, a data packet passed to the unsecure site 92 may be transferred from bi-directional protocol to uni-directional protocol by Gateway 41 or 42.

TABLE 1

| VLAN ID | ports |
| --- | --- |
| VLAN ID 11 | port P1, port 6, port P7 |
| VLAN ID 12 | port P2, port 6, port P7 |
| VLAN ID 13 | port P3, port P7 |
| VLAN ID 14 | port P4, port P7 |
| VLAN ID 15 | port P5, port P7 |

Figure 4:
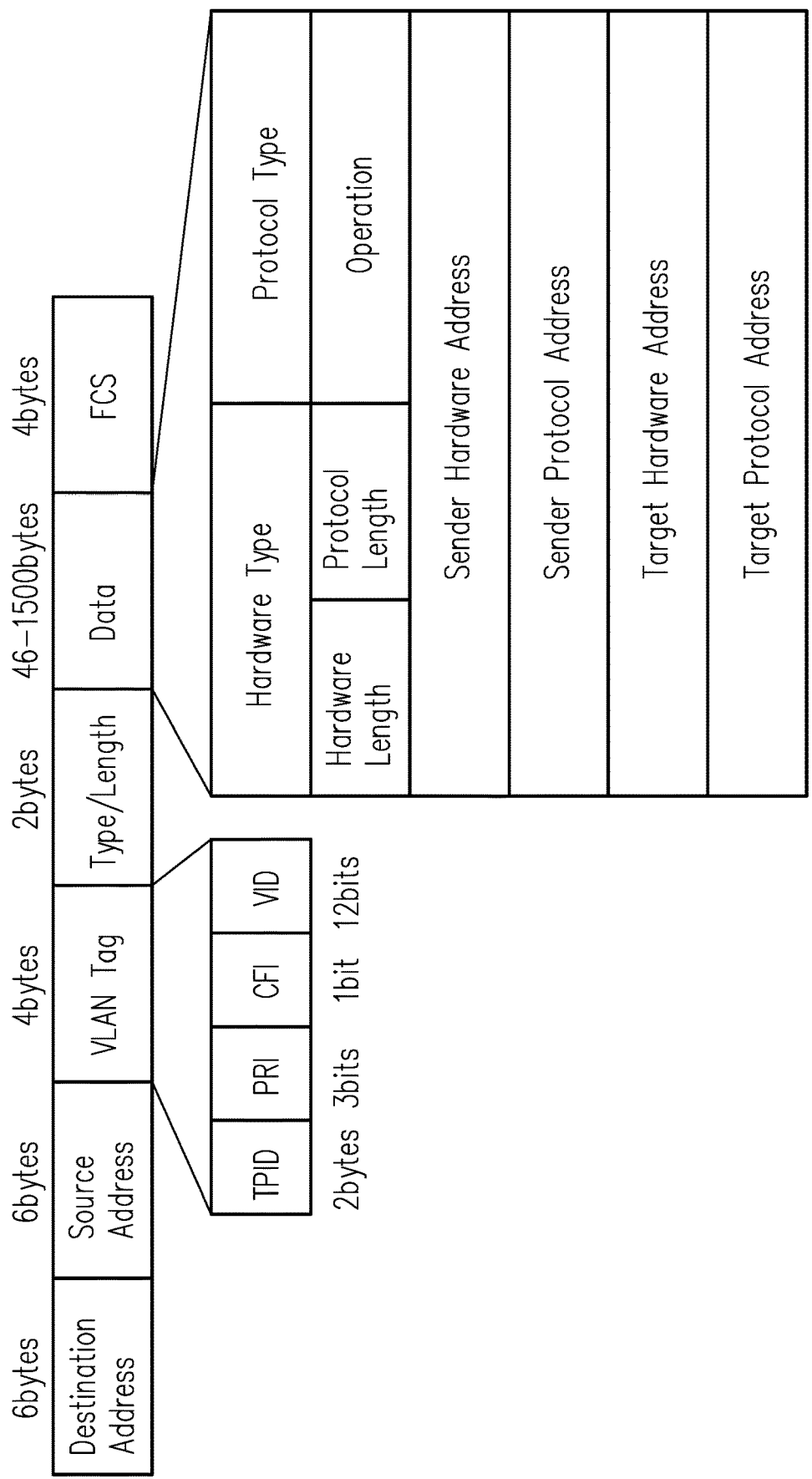
FIG. 4 illustrates a schematic diagram of a packet format according to an embodiment of the disclosure.

FIG. 4 illustrates a schematic diagram of a packet format 40 (e.g., standard Ethernet frame) according to an embodiment of the disclosure. Any data packet transmitted inside the switch 100 may be formed based on the packet format 40. For example, the controller 110 may pack the first data packet based on the packet format 40 to generate the second data packet. The packet format 40 may include a destination address field, a source address field, a VLAN tag field (e.g., 802.1Q tag field), an type/length value field (e.g., an Ether-type/length value field), a data field (or payload field), and a frame check sequence (FCS) field. The destination address field may store a destination address such as the MAC address of the target device. For example, since the target device of the second data packet is the device 44, the destination address field of the second data packet may store the MAC address of the device 44. The source address field may store a source address such as the MAC address of the source device. For example, since the source device of the second data packet is the gateway 41, the sources address field of the second data packet may store the MAC address of the gateway 41. The VLAN tag field may store a tag protocol identifier (TPID), a priority (PRI), a canonical format indicator (CFI), or a VLAN ID (i.e., VID). For example, the controller 110 may generate the second data packet by modifying the VLAN tag field of the first data packet to record VLAN ID 11. The type/length value field may store type of data packet. For example, in FIG. 4, the type/length value field may store "0x0806" if the packet format 40 is corresponding to an address resolution protocol (ARP) data packet. The data field may store a sender hardware address (e.g., MAC address of the source device), a sender protocol address (e.g., IP address of the source device), a target hardware address (e.g., MAC address of the target device), or a target protocol address (e.g., IP address of the target device). For example, the data field of the second data packet may include the MAC address of the gateway 41 as the sender hardware address, the IP address of the gateway 41 as the sender protocol address, the MAC address of the device 44 as the target hardware address, and the IP address of the device 44 as the target protocol address. In one embodiment, the target protocol address may be blanked. For example, the target protocol address of an ARP query may be blanked and the Destination address of the ARP query may be a broadcast address (e.g., 0xFF). The FCS field may store an FCS value corresponding to the data field. The FCS value may be calculated according to the data field. If the data in the data field is changed, the FCS value may be changed accordingly. For example, in response to generating the second data packet, the controller 110 may modify the data field of the first data packet to include VLAN ID 11. That is, the FCS value of the second data packet should be different from the FCS value of the first data packet. The controller 110 may calculate the FCS value of the second data packet according to the modified data field.

Referring back to FIG. 3, in step S303, in response to receiving the second data packet, the PLD 200 may determine whether the second data packet is an address query packet (or a ARP packet) or not, wherein the address query packet may be, for example, an ARP query. Specifically, the data field of the second data packet may further store an ARP indicator (e.g., Ether-type "0x0806") in the operation field. The ARP indicator may indicate that whether the second data packet is an address query packet or not. In response to receiving the second data packet from the port P7, the PLD 200 may determine whether the second data packet is address query packet (or ARP packet) or not according to the operation field of the second data packet. If the second data packet is an address query packet, proceed to step S308. If the second data packet is not an address query packet (or ARP packet), proceed to step S304.

In step S304, the PLD 200 may filter the second data packet and determine whether the second data packet is matched with a mapping table. If the second data packet is matched with the mapping table, proceed to step S306. If the second data packet is not matched with the mapping table, proceed to step S305. Specifically, the PLD 200 may filter the second data packet according to the first filtering rule. The first filtering rule may be associated with a TCP/UDP port number or a transmission protocol. Furthermore, the filtering rule may include the mapping table, wherein the mapping table may include a mapping relationship between a MAC address and a VLAN ID. In one embodiment, the mapping table may further include an IP address corresponding to the MAC address and the VLAN ID. The PLD 200 may determine that the second data packet is matched with the mapping table in response to a mapping relationship between the destination address of the second data packet and the VLAN ID of the second data packet being recorded in the mapping table. The PLD 200 may determine that the second data packet is not matched with the mapping table in response to the mapping relationship between the destination address of the second data packet and the VLAN ID of the second data packet not being recorded in the mapping table. Table 2 is an example of the mapping table stored in the PLD 200, the mapping table may record a mapping relationship between the MAC address of the gateway 41 and the VLAN ID 11. Assuming the data field of the second data packet stores the VLAN ID 11. The PLD 200 may determine that the second data packet is matched with the mapping table if the source address of the second data packet is the MAC address of the gateway 41, and the PLD 200 may determine that the second data packet is not matched with the mapping table if the source address of the second data packet is not the MAC address of the gateway 41.

TABLE 2

| MAC address | IP address | VLAN ID |
| --- | --- | --- |
| MAC address of gateway 41 | IP address of gateway 41 | VLAN ID 11 |
| MAC address of gateway 42 | IP address of gateway 42 | VLAN ID 12 |
| MAC address of device 43 | IP address of device 43 | VLAN ID 13 |

TABLE 2-continued

| MAC address | IP address | VLAN ID |
| --- | --- | --- |
| MAC address of device 44 | IP address of device 44 | VLAN ID 14 |
| MAC address of device 45 | IP address of device 45 | VLAN ID 15 |

In step S305, the PLD 200 may drop the second data packet or may transmit the second data packet to the storage device 61 for further analysis.

In step S306, the PLD 200 may overwrite the first VLAN ID of the second data packet by a second VLAN ID corresponding to a second path so as to generate a third data packet, wherein the second VLAN ID may be corresponded to the path between the PLD 200 and the target device. That is, the PLD 200 may select the second VLAN ID from the mapping table according to the destination address of the second data packet. For example, the PLD 200 may overwrite the VLAN ID 11 in the second data packet by the VLAN ID 14 to generate the third data packet, wherein the VLAN ID 14 may be corresponded to the path 14 between the PLD 200 and the device 44 (i.e., target device).

In response to overwriting the first VLAN ID of the data field by the second VLAN ID, the PLD 200 may recalculate an FCS value for the third data packet according to the updated data field. In other words, the PLD 200 may update the FCS value of the second data packet to generate the third data packet.

In step S307, the PLD 200 may transmit the third data packet to the target device. For example, the PLD 200 may transmit the third data packet to the device 44 via the port P7, the path 14, and the port P4.

In step S308, the PLD 200 may determine whether the second data packet is matched with a mapping table. If the second data packet is matched with the mapping table, proceed to step S312. If the second data packet is not matched with the mapping table, proceed to step S309. Specifically, the PLD 200 may store a mapping table, wherein the mapping table may include a mapping relationship among a MAC address, an IP address, and a VLAN ID. If the second data packet is an address query packet, the sender hardware address, the sender protocol address, and the target protocol address of the second data packet may be filled in by the source device, and the source device may leave the target hardware address of the second data packet blank. In other words, the MAC address of the target device is unknown to the second data packet. The PLD 200 may check whether a mapping relationship between the IP address of the target device and a MAC address is recorded in the mapping table. The PLD 200 may determine that the second data packet is matched with the mapping table in response to a mapping relationship between the IP address of the target device and a MAC address being recorded in the mapping table, and the PLD 200 may determine that the second data packet is not matched with the mapping table in response to the mapping relationship between the IP address of the target device and a MAC address not being recorded in the mapping table.

Table 3 is an example of the mapping table stored in the PLD 200. The mapping table may be added in response to a data packet being received by the PLD 200. The IP address, VLAN ID and MAC address can be recorded into the mapping table. For example, after connecting to the switch 100, a network device may issue a broadcast packet (e.g., ARP response) to the intranet devices (e.g., devices coupled to the switch 100) so as to inform the intranet devices the hardware address and the software address of the network device. In response to receiving the broadcast packet, the PLD 200 may add a mapping relationship between the IP address of the network device and the MAC address of the network device to the mapping table. In one embodiment, the second data packet transmitted from the gateway 41 to the PLD 200 may include a MAC address of the gateway 41, an IP address of the gateway 41, and an IP address of a target device. The PLD 200 may determine whether a mapping relationship between the IP address of the target device and a MAC address is recorded in Table 3. Since a mapping relationship between the IP address of the target device and the MAC address of the device 44 is recorded in Table 3, the PLD 200 may determine that the IP address of the target device is corresponded to the device 44. Accordingly, the PLD 200 may determine that the second data packet is matched with the mapping table.

TABLE 3

| MAC address | IP address | VLAN ID |
| --- | --- | --- |
| MAC address of gateway 41 | IP address of gateway 41 | VLAN ID 11 |
| MAC address of device 44 | IP address of target device | VLAN ID 14 |

Table 4 is an example of the mapping table stored in the PLD 200. The second data packet transmitted from the gateway 41 to the PLD 200 may include a MAC address of the gateway 41, an IP address of the gateway 41, and an IP address of a target device. The PLD 200 may determine whether a mapping relationship between the IP address of the target device and a MAC address is recorded in Table 4. Since no mapping relationship between the IP address of the target device and a MAC address is recorded in Table 4, the PLD 200 may determine that the second data packet is not matched with the mapping table.

Table 4

| MAC address | IP address | VLAN ID |
| --- | --- | --- |
| MAC address of gateway 41 | IP address of gateway 41 IP address of target device | VLAN ID 11 |

In step S309, the PLD 200 may broadcast the IP address of the target device to one or more external device coupled to the switch 100. For example, the PLD 200 may duplicate the second data packet to generate a plurality of broadcast data packets, wherein each of the broadcast data packets may include an IP address of the target device and a dedicated VLAN ID. That is, different broadcast data packet may have different VLAN ID. For example, the PLD 200 may generate a broadcast data packet according to the second data packet and transmit the broadcast data packet to the device 44 via the port P4, wherein the broadcast data packet may include the IP address of the target device and the VLAN ID 14. Similarly, the PLD 200 may generate a broadcast data packet according to the second data packet and transmit the broadcast data packet to the device 43 via the port P3, wherein the broadcast data packet may include the IP address of the target device and the VLAN ID 13. The PLD 200 may generate a broadcast data packet according to the second data packet and transmit the broadcast data packet to the gateway 42 via the port P2, wherein the broadcast data packet may include the IP address of the target device and the VLAN ID 12. The PLD 200 may generate a broadcast data packet according to the second data packet and transmit the broadcast data packet to the device 45 via the port P5, wherein the broadcast data packet may include the IP address of the target device and the VLAN ID 15.

In step S310, the PLD 200 may receive a MAC address from a target device (i.e., device 44) in response to broadcasting the IP address of the target device, and the PLD 200 may generate a response packet corresponding to the second data packet (i.e., address query packet), wherein the target device is one of the one or more external device receiving the broadcast data packet. Specifically, assuming that the IP address of the target included in the broadcast data packet is equal to the IP address of the device 44. That is, the device 44 is the target device of the second data packet. Accordingly, the device 44 may transmit the MAC address of the device 44 to the PLD 200 via the port P4, the path 14, and the port P7 in response to receiving the broadcast data packet. After receiving the MAC address of the device 44, the PLD 200 may set the source address of the response packet to the received MAC address. For example, the PLD 200 may set the source address of the response packet to the MAC address of the device 44. In addition, the PLD 200 may set the destination address of the response packet to the source address of the second data packet. For example, the second data packet may include the MAC address of the gateway 41 as the source address. The PLD 200 may set the destination address of the response packet to the MAC address of the gateway 41. Furthermore, the PLD 200 may set the target hardware address of the response packet to the received MAC address, wherein the target hardware address is included in the data field of the response packet, and the target hardware address is the information which has not been filled in the second data packet. For example, the PLD 200 may set the target hardware address of the response packet to the MAC address of the device 44, wherein the MAC address of the device 44 has not been stored in the second data packet.

In one embodiment, in response to receiving the MAC address from the target device, the PLD 200 may add a mapping relationship between the IP address of the target device and the MAC address of the target device to the mapping table. For example, assuming that the mapping table stored in the PLD 200 presently is Table 4. In response to receiving the MAC address from the device 44 as a feedback of the broadcast data packets, the PLD 200 may determine that the IP address of the target device is corresponded to the MAC address of the device 44. Thus, the PLD 200 may add a relationship between the IP address of the target device and the MAC address of the device 44 to Table 4. Accordingly, Table 4 may be modified to Table 3 by the PLD 200.

In step S311, the PLD 200 may transmit the response packet to the source device (i.e., gateway 41), wherein the response packet may be an ARP response corresponding to the ARP query. Specifically, the PLD 200 may transmit the response packet to the gateway 41 via the port P7, the path 11, and the port P1.

In step S312, the PLD 200 may generate a response packet corresponding to the second data packet (i.e., address query packet) according to the mapping table. Specifically, the PLD 200 may set the source address of the response packet to the MAC address associated with the IP address of the target device. Taking Table 3 as an example, in response to the mapping relationship between the IP address of the target device and the MAC address of the device 44 being recorded in Table 3, the PLD 200 may determine that the IP address of the target device is associated with the MAC address of the device 44. Thus, the PLD 200 may set the source address of the response packet to the MAC address of the device 44 according to the mapping table. That is, the IP address of the target device may not need to be broadcasted to the actual target device (i.e., device 44) so as to obtain the MAC address of the target device. After receiving an ARP query from a source device, the PLD 200 may generate an ARP response corresponding to the ARP query based on an established mapping table. The step of duplicating the ARP query or broadcasting the ARP query can be omitted. Therefore, the source device may obtain the IP address of the target device in a shorter time.

In addition, the PLD 200 may set the destination address of the response packet to the source address of the second data packet. For example, the second data packet may include the MAC address of the gateway 41 as the source address. The PLD 200 may set the destination address of the response packet to the MAC address of the gateway 41. Furthermore, the PLD 200 may set the target hardware address of the response packet to the MAC address associated with the IP address of the target device, wherein the target hardware address is included in the data field of the response packet, and the target hardware address is the information which has not been filled in the second data packet. For example, the PLD 200 may determine that the MAC address of the device 44 is associated with the IP address of the target device. Thus, the PLD 200 may set the target hardware address of the response packet to the MAC address of the device 44.

Figure 5:
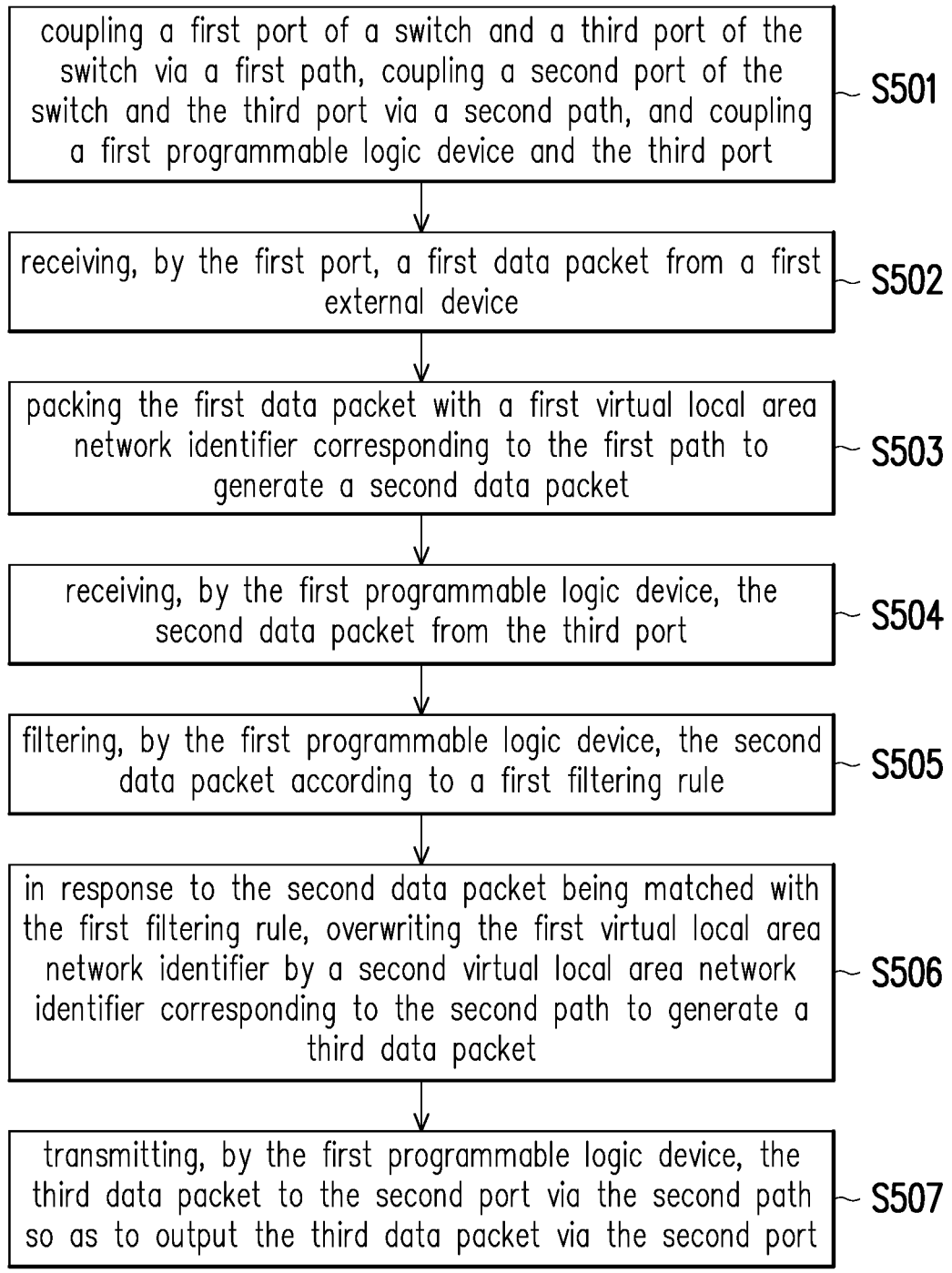
FIG. 5 illustrates a flowchart of a communication method for one-way transmission based on VLAN ID according to an embodiment of the disclosure.

FIG. 5 illustrates a flowchart of a communication method for one-way transmission based on VLAN ID according to an embodiment of the disclosure, wherein the communication method may be implemented by the switch device 10 as shown in FIG. 1. In step S501, coupling a first port of a switch and a third port of the switch via a first path, coupling a second port of the switch and the third port via a second path, and coupling a first programmable logic device and the third port. In step S502, receiving, by the first port, a first data packet from a first external device. In step S503, packing the first data packet with a first virtual local area network identifier corresponding to the first path to generate a second data packet. In step S504, receiving, by the first programmable logic device, the second data packet from the third port. In step S505, filtering, by the first programmable logic device, the second data packet according to a first filtering rule. In step S506, in response to the second data packet being matched with the first filtering rule, overwriting the first virtual local area network identifier by a second virtual local area network identifier corresponding to the second path to generate a third data packet. In step S507, transmitting, by the first programmable logic device, the third data packet to the second port via the second path so as to output the third data packet via the second port.

In summary, the present disclosure may decrease the delay of the one-way transmission between the secure site and the unsecure site by configuring a switch device instead of a high-end computer to connect the secure site and the unsecure site. Compared to the high-end computer, the switch device may not need to retrieve all the content (e.g., each layer of the communication protocol stack of the data packet) of the data packet when forwarding the data packet with a predefined protocol. The switch device may include a PLD which may filter data packets for the transmission between the devices in the secure site. Before forwarding the filtered data packet to the destination, the PLD may update the VLAN ID of the data packet so as to prevent the data packet from violating the rules defined by the address table of the switch. On the other hand, the PLD may establish or update a mapping table (e.g., ARP table) including a mapping relation between an IP address and a MAC address of a target device. If a source device transmits an ARP query to the target device, the PLD may reply an ARP response to the source device for the target device. Thus, the ARP query may not need to forward to the target device and the source device may get the MAC address of the target device in a shorter time.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items" and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A switch device for one-way transmission based on virtual local area network identifier, comprising:
    a switch, comprising:
        a first port;
        a second port;
        a third port configured to be coupled to the first port via a first path and coupled to the second port via a second path; and
        a controller coupled to the first port, the second port, and the third port; and
    a first programmable logic device coupled to the third port, wherein
    the first port receives a first data packet from a first external device;
    the controller packs the first data packet with a first virtual local area network identifier corresponding to the first path to generate a second data packet;
    the first programmable logic device receives the second data packet from the third port and filters the second data packet according to a first filtering rule;
    in response to the second data packet being matched with the first filtering rule, the first programmable logic device overwrites the first virtual local area network identifier by a second virtual local area network identifier corresponding to the second path to generate a third data packet;
    the first programmable logic device transmits the third data packet to the second port via the second path so as to output the third data packet via the second port;
    the first port receives an address query packet from the first external device and transmits the address query packet to the third port, wherein the address query packet comprises an Internet protocol (IP) address;
    the first programmable logic device stores a mapping table, receives the address query packet from the third port, and determines whether a first mapping relationship between the IP address and a media access control (MAC) address being recorded in the mapping table; and
    the first programmable logic device generates a response packet corresponding to the address query packet by setting a source address of the response packet to the MAC address in response to determining the first mapping relationship being recorded in the mapping table.

2. The switch device according to claim 1, wherein the second data packet comprises a destination address, wherein
    the first programmable logic device overwrites the first virtual local area network identifier by the second virtual local area network identifier in response to a second mapping relationship between the destination address and the second virtual local area network identifier being recorded in the mapping table.

3. The switch device according to claim 2, wherein the first programmable logic device drops the second data packet in response to the second mapping relationship between the destination address and the second virtual local area network identifier not being recorded in the mapping table.

4. The switch device according to claim 2, wherein the second data packet further comprises a frame check sequence, wherein the first programmable logic device updates the frame check sequence to generate the third data packet in response to overwriting the first virtual local area network identifier by the second virtual local area network identifier.

5. The switch device according to claim 1, wherein
    the first programmable logic device transmits the response packet to the first port via the third port.

6. The switch device according to claim 5, wherein the first programmable logic device generates the response packet by following steps in response to determining the first mapping relationship not being recorded in the mapping table:
    broadcasting the IP address to a second external device via the second port;
    receiving the MAC address from the second external device via the second port in response to broadcasting the IP address; and
    setting the source address of the response packet to the MAC address.

7. The switch device according to claim 6, wherein the first programmable logic device adds the first mapping relationship between the IP address and the MAC address to the mapping table in response to receiving the MAC address from the second external device.

8. The switch device according to claim 1, wherein the first programmable logic device generates the response packet further by:
    setting a target hardware address of the response packet to the MAC address.

9. The switch device according to claim 1, wherein the first filtering rule corresponds to at least one of a port number or a transmission protocol, wherein the transmission protocol comprises one of a Modbus protocol, an IEC 60870-5-104 protocol, a distributed network protocol, and a programmable logic controller protocol.

10. A communication method for one-way transmission based on virtual local area network identifier, comprising:

coupling a first port of a switch and a third port of the switch via a first path, coupling a second port of the switch and the third port via a second path, and coupling a first programmable logic device and the third port;

receiving, by the first port, a first data packet from a first external device;

packing the first data packet with a first virtual local area network identifier corresponding to the first path to generate a second data packet;

receiving, by the first programmable logic device, the second data packet from the third port;

filtering, by the first programmable logic device, the second data packet according to a first filtering rule;

in response to the second data packet being matched with the first filtering rule, overwriting the first virtual local area network identifier by a second virtual local area network identifier corresponding to the second path to generate a third data packet;

transmitting, by the first programmable logic device, the third data packet to the second port via the second path so as to output the third data packet via the second port;

receiving an address query packet from the first external device and transmitting the address query packet to the third port by the first port, wherein the address query packet comprises an Internet protocol (IP) address;

storing a mapping table, receiving the address query packet from the third port, and determining whether a first mapping relationship between the IP address and a media access control (MAC) address being recorded in the mapping table by the first programmable logic device; and generating, by the first programmable logic device, a response packet corresponding to the address query packet by setting a source address of the response packet to the MAC address in response to determining the first mapping relationship being recorded in the mapping table.

* * * * *